US005273949A

United States Patent [19]

Chopin et al.

[11] Patent Number: 5,273,949

[45] Date of Patent: Dec. 28, 1993

[54] SILICA-STABILIZED ALUMINA

[75] Inventors: Thierry Chopin, Saint Denis; Georges Dovergne; Jean-Luc Le Loarer, both of Salindres, all of France

[73] Assignee: Rhone-Poulenc Chimie, Courbevoie, France

[21] Appl. No.: 882,556

[22] Filed: May 13, 1992

[30] Foreign Application Priority Data

May 14, 1991 [FR] France ................................ 91 05841

[51] Int. Cl.[5] ................................................ B01J 21/12

[52] U.S. Cl. ...................................... 502/238; 502/263

[58] Field of Search ......................... 502/238, 263, 355

[56] References Cited

U.S. PATENT DOCUMENTS

| | | | |
|---|---|---|---|
| 2,394,796 | 2/1946 | Marisic | 502/238 |
| 4,061,594 | 12/1977 | Michel et al. | 252/462 |
| 4,438,219 | 3/1984 | Brandenburg et al. | 502/333 |
| 4,722,920 | 2/1988 | Kimura et al. | 502/439 |
| 4,959,338 | 9/1990 | Miura et al. | 502/238 |

FOREIGN PATENT DOCUMENTS

| | | | |
|---|---|---|---|
| 522409 | 6/1940 | United Kingdom | 502/238 |

OTHER PUBLICATIONS

*Chemical Abstracts*, vol. 95, No. 20, p. 467, Nov. 16, 1981, No. 176314f, Columbus, Ohio, U.S.; K. Jiratova, "Isoelectric Point of Modified Aluminia", *Appl. Catal.* (1981), vol. 1, Nos. 3, 4, pp. 165-167.

*Chemical Abstracts*, vol. 84, No. 26, 28, Jun. 1976, p. 345, No. 185386f, Columbus, Ohio, U.S.; B. E. Yoldas, "Thermal Stabilization of an Active Alumina and Effect of Dopants on the Surface Area", *J. Mater. Sci.* (1976), vol. 11, No. 3, pp. 465-470.

*Primary Examiner*—Carl F. Dees

*Attorney, Agent, or Firm*—Burns, Doane, Swecker & Mathis

[57] ABSTRACT

Thermally stable alumina having a high specific surface at elevated temperatures, well suited as a catalyst support material, e.g., as the support substrate of catalysts useful for the conversion of exhaust gases emanating from internal combustion engines, contain an effective heat stabilizing amount of silica, such silica essentially being distributed within the crystalline network/structure of the alumina, and such silica-stabilized alumina having an isoelectric point above 7 and a reduced capacity for the isomerization of olefins.

27 Claims, No Drawings

SILICA-STABILIZED ALUMINA

BACKGROUND OF THE INVENTION

1. Field of the Invention

The present invention relates to a novel alumina stabilized by silica and retaining a high specific surface at high temperatures, to a process for the production thereof and to the use of such silica-stabilized alumina as a catalyst support material.

2. Description the Prior Art

More particularly for the treatment/conversion of exhaust gases emanating from internal combustion engines, it is known to this art to employ catalysts therefor whose support is based on alumina. It is also known to this art that the efficiency of a catalyst increases in direct proportion to the size of the contract surface between the catalyst and the reagents. To effect this desired result, it is necessary for the catalyst to be maintained in a maximum finely divided state, i.e., the solid catalytic particles constituting same must be as small and individualized as possible. Therefore, the fundamental function of the support is to maintain the catalyst particles or crystallites in contact with the reagents in the maximum finely divided state.

In light of the severe conditions to which exhaust gas treatment catalysts are subjected, their supports, on which precious metals can be deposited, must display excellent thermal stability, i.e., must retain a high specific surface at high temperatures, in particular up to 1,200° C.

The alumina normally used as a support for such catalysts undergoes an irreversible phase transformation into α-alumina under the influence of high temperatures (particularly equal to or above 1000° C.), which reduces its specific surface to less than 10 $m^2/g$ and effects a sintering of the catalytic phase. The catalyst deteriorates and loses a significant proportion of its efficiency.

It too is known to this art to add to the alumina various compounds for improving its thermal aging properties. Thus, it is known to impregnate a preshaped, calcined, alumina-based catalyst support with a rare earth metal nitrate solution (U.S. Pat. No. 4,061,594) or with a solution of a silicon compound. However, the aluminas obtained still have an inadequate specific surface at high temperature.

SUMMARY OF THE INVENTION

Accordingly, a major object of the present invention is the provision of a novel silica-stabilized alumina retaining a high specific surface at high temperatures, the silica being distributed in the crystalline structure of the alumina, as well as a process for the production of such stabilized alumina.

Briefly, the present invention features a novel silica-stabilized alumina, the silica component thereof essentially not being situated on the exposed surfaces of the alumina, but confined within the crystalline network thereof, in contradistinction to the prior art silica-stabilized aluminas. Thus, said silica is essentially internally distributed within the crystalline structure of the alumina. This phenomenon is evidenced by the value of the isoelectric point of the stabilized alumina according to the invention and also by its capacity to isomerize olefins.

DETAILED DESCRIPTION OF THE PREFERRED EMBODIMENTS OF THE INVENTION

More particularly according to the present invention, by "isoelectric point" is intended the pH of a suspension of the subject alumina in an electrolyte (e.g., a sodium nitrate solution) for which the electrophoretic mobility of a particle of said alumina in the electrolyte is zero, i.e., for which the zeta power is zero and this applies no matter what the ionic strength of the medium ("Zeta Potential in Coloid Science", Robert J. Hunter, Academic Press, 1981).

The stabilized alumina according to the invention has an isoelectric point higher than 7 and preferably at least 8 or higher. It is very close to that of unstabilized alumina, which evidences that the incorporated silica has very little effect on the surface charges.

The isomerizing power, or capacity to isomerize olefins, of the stabilized alumina according to the invention is determined by carrying out an isomerization test of butene (mixture of 1-butene, cis-2-butene and trans-2-butene) into isobutene. For this purpose, 500 mg of stabilized alumina according to the invention are introduced into a reactor. The product is conditioned for 2 hours at 500° C. under helium scavenging at a flow rate of 2.5 l/h. 1 ml of butene is injected into the helium flowstream. Analysis of the discharged gases by chromatography makes it possible to measure the amount of 1-butene, cis- and trans-2-butene and isobutene recovered.

By calculation, determination is made of the theoretical thermodynamic equilibrium $K_{th}(T)$ and as a result of the measurements, the real equilibrium constant K(T):

$$K_{th}(T) = \frac{[\text{isobutene}]_e}{[\text{1-butene}]_e + [\text{cis-2-butene}]_e + [\text{trans-2-butene}]_e}$$

$$K(T) = \frac{[\text{isobutene}]}{[\text{1-butene}] + [\text{cis-2-butene}] + [\text{trans-2-butene}]}$$

in which T is the temperature of the butene on exiting the reactor, the other values representing the concentrations on exiting the reactor ([ ]) or at equilibrium ($[\ ]_e$) for the temperature T.

The isomerizing power or isomerization rate A(T) is then given by the following formula:

$$A(T) = \frac{K(T)}{K_{th}(T)}$$

The isomerizing power of the olefins of the stabilized alumina according to the invention is low and below that of aluminas stabilized by silica (for the same $Na_2O$ level) by impregnation according to prior art techniques.

The silica content of the stabilized alumina according to the invention advantageously ranges from 1% to 20%, preferably from 1.5% to 15% and more preferably from 2% to 11%; still more preferably, it ranges from 4% to 8% by weight.

After calcination at 1,200° C. for 4 hours, the alumina according to the invention has a specific surface (measured by the B.E.T. method) above 50 $m^2/g$, preferably ranging from 55 to 85 $m^2/g$ and more preferably from 60 to 80 $m^2/g$. Thus, its specific surface at high temperatures is greater than that of other aluminas stabilized according to prior art techniques.

The present invention also features a process for the preparation of the alumina described above, the stabilizing agent being incorporated into the alumina during a specific stage of the process.

Thus, the present invention features a process for the preparation of the subject alumina from an alumina powder produced by the rapid dehydration of an aluminum hydroxide or oxyhydroxide, in which the powder is subjected to a ripening or aging operation in the presence of at least one stabilizing agent constituted by at least one compound of silicon, followed by a heat treatment. The aging operation entails rehydrating the starting material alumina powder, producing the crystalline phase designated as boehmite. This rehydration is a dissolution/reprecipitation process. It preferably is carried out by suspending alumina powder in water at a concentration normally ranging from 50 to 600 g/l, e.g., from 200 to 350 g/l.

In a preferred embodiment of the process according to the invention, such rehydration is carried out in the presence of at least one stabilizing agent comprising a compound of silicon.

The compound of silicon can be any silica precursor. It is therefore possible to use an organic derivative of silicon in solution (such as an alkoxide), a silica sol (optionally stabilized by $Na_2O$, in a $SiO_2/Na_2O$ weight ratio generally ranging from 25 to 50), which either may or may not be diluted. It is also possible to use a quaternary ammonium silicate in aqueous solution, particularly tetraethyl ammonium silicate, tetrapropyl ammonium silicate, tetrahydroxyethyl ammonium silicate (or tetraethanol ammonium silicate). It is preferable to use a silica sol.

The amount of silicon compound added is such that it corresponds to a quantity advantageously ranging from 1% to 20%, preferably from 1.5% to 15% and more preferably from 2% to 11% by weight; even more preferably, it ranges from 4% to 8% by weight silica based on the total finished stabilized alumina weight.

Following the introduction of the stabilizing agent, the pH of the suspension is adjusted to a value preferably ranging from 8 to 12, e.g., from 9 to 11, by adding a random base, generally a weak base, e.g., ammonia.

The aging operation is advantageously carried out at a temperature ranging from 70° to 110° C., preferably approximately 100° C., e.g., ranging from 95° to 100° C.

The aging is typically conducted for from 1 to 48 hours. When the aging operation is carried out at a temperature not exceeding 100° C., its duration ranges from 10 to 48 hours, preferably from 20 to 30 hours. When it is carried out at a temperature exceeding 100° C., an autoclave is typically employed and then the aging time may only be 1 to 6 hours, preferably 1 to 4 hours.

The alumina obtained is at least partly in the form of boehmite or pseudoboehmite, its boehmite or pseudoboehmite proportion generally ranging from 5% to 35% and preferably from 10% to 30% by weight. This alumina is then separated by any known liquid/solids separation technique, e.g., by filtration.

If necessary, the liquid/solids separation operation can entail a purification treatment making it possible to effectively eliminate the soda (which may be present in the initial alumina powder) and/or other impurities, particularly those possibly emanating from the stabilizing agent used.

It is therefore possible to prepare a stabilized alumina having a high degree of purity directly from products containing impurities as regards the intended application, which is not generally the case with the prior art alumina stabilization techniques.

The heat treatment is normally carried out at a temperature ranging from 100° to 700° C. for a sufficient time to remove the water not chemically bonded with the alumina, e.g., for from 2 to 32 hours. This heat treatment can entail drying, optionally followed by calcination. The drying is carried out at a temperature generally ranging from 100° to 250° C., preferably from 100° to 200° C., for a period of time usually ranging from 2 to 24 hours. Calcination is carried out at a temperature generally ranging from 250° to 700° C., preferably from 350° to 600° C., for a period of time generally ranging from 1 to 8 hours.

The starting material alumina powder used in the process according to the invention is produced by the rapid dehydration of at least one aluminum hydroxide such as bayerite, hydrargillite or gibbsite, nordstrandite and/or at least one aluminum oxyhydroxide such as boehmite and diaspore.

The dehydration is carried out in any suitable apparatus by means of a hot gas flowstream making it possible to eliminate and very rapidly entrain the evaporated water. The temperature at which said gases enter the apparatus generally ranges from approximately 400° to 1,200° C., e.g., approximately 800° to 1,200° C., employing a contact time between the hydroxide or oxyhydroxide and the hot gases of a fraction of a second to 4 to 5 seconds.

The alumina resulting from this dehydration can optionally be subjected to a treatment for at least partly eliminating the alkalis present The specific surface, measured by the B.E.T. method, of the alumina resulting from rapid aluminum hydroxide and/or oxyhydroxide dehydration generally ranges from approximately 50 to 450 $m^2/g$, the particle diameter ranging from 0.1 to 300 μm, preferably from 1 to 120 μm. This alumina typically has a pore volume of approximately 0.10 to 0.50 $cm^3/g$, the pores generally having dimensions below 50 nm.

In another preferred embodiment of the invention, the starting material alumina is produced by the rapid dehydration of Bayer hydrate (hydrargillite), which is a readily available and very inexpensive industrial aluminum hydroxide. Such an alumina is well known to this art and is more particularly described in French Patent No. 1,108,011.

Consequently, the process according to the invention enables production of an alumina of the type described above having an excellent thermal stability, i.e., retaining a high specific surface at high temperatures. Its specific surface, after calcination at 1,200° C. for 4 hours, advantageously exceeds 50 $m^2/g$, preferably ranges from 55 to 85 $\mu m^2/g$ and more preferably from 60 to 80 $m^2/g$ (measured by the B.E.T. method).

The silica is not essentially distributed on the alumina surface, but is instead distributed within the crystalline structure of the alumina, as opposed to the final product produced by conventionally impregnating the alumina with a solution of a silica precursor.

The stabilized alumina of the invention consequently has an isoelectric point above 7 and preferably is at least 8 and which exhibits a low olefin isomerizing power. In particular, its isomerizing power is generally at least twice lower and preferably at least three times lower than that of an alumina impregnated by a silica precursor solution and having an identical level of $Na_2O$.

The stabilized alumina according to the invention can be used as a catalyst support. It is more particularly useful as a catalyst support substrate for the catalytic conversion of exhaust gases emanating from internal combustion engines. It can be used either in the form of spheres, or in the form of a porous coating layer or washcoat, which is deposited onto a monolithic ceramic or metal support. The active phase of the catalyst can be constituted by precious metals. A particularly useful such active phase is described in U.S. Pat. No. 4,378,307.

In order to further illustrate the present invention and the advantages thereof, the following specific examples are given, it being understood that same are intended only as illustrative and in nowise limitative.

EXAMPLE 1 (Comparative)

The starting material used was an alumina powder having a specific surface of approximately 350 $\mu m^2/q$ and produced by rapid dehydration of hydrargillite.

This alumina powder was impregnated with 5% by weight silica using a dilute silica sol, designated LUDOX SM and marketed by Du Pont, followed by drying at 120° C. for 12 hours. The thus obtained alumina, after calcination at 1,200° C. for 4 hours, had a specific surface of 21 $\mu m.2/g$.

The same result was obtained by using the silica sol CECASOL 2C marketed by CECA SA.

EXAMPLE 2 (According to the Invention)

The same starting material as in Example 1 was used. This alumina powder was aged, i.e., rehydrated by suspending it in water at a concentration of 250 g/l for 24 hours at 98° C., a silica sol (designated LUDOX SM and marketed by Du Pont) having been added at the start of the operation in an amount such that it corresponded to 2% by weight silica based on the total finished stabilized alumina weight. The pH was adjusted to approximately 10 by adding ammonia at the start of the operation.

At the end of the treatment, a liquid/solids separation was carried out, followed by the drying of the alumina at 120° C. for 12 hours. The thus obtained alumina had, after calcination at 1,200° C. for 4 hours, a specific surface of 60 $m^2/g$.

EXAMPLE 3 (According to the Invention)

The procedure of Example 2 was repeated, except that the added silica sol quantity was such that it corresponded to 5% by weight silica, based on the total finished stabilized alumina weight. The alumina was then calcined at 500° C. for 2 hours. The thus obtained alumina had a $Na_2O$ level, based on the total finished stabilized alumina weigh, of 150 ppm. It had an isoelectric point of 8.5 and an isomerizing power (or isomerization level) of the olefins A(T) of 5.4% (at T=400° C.). After calcining at 1,200° C. for 4 hours, it had a specific surface of 78 $m^2/g$.

EXAMPLE 4 (According to the Invention)

The procedure of Example 2 was repeated, except that the added silica sol quantity was such that it corresponded to 10% by weight silica, based on the total finished stabilized alumina weight. After calcining at 1,200° C. for 4 hours, the alumina obtained has a specific surface of 70 $m^2/g$.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermally stable alumina having a high specific surface at elevated temperatures, comprising an effective heat stabilizing amount of silica, said silica essentially being distributed within the crystalline network of the alumina, and said silica-stabilized alumina having an isoelectric point above 7.

2. The silica-stabilized alumina as defined by claim 1, having an isoelectric point of at least 8.

3. The silica-stabilized alumina as defined by claim 1, having a specific surface greater than 50 $m^2/g$ after calcination at 1200° C. for 4 hours.

4. The silica-stabilized alumina as defined by claim 3, having a specific surface ranging from 55 to 85 $m^2/g$, after calcination at 1,200° C. for 4 hours.

5. The silica-stabilized alumina as defined by claim 4, having a specific surface ranging from 60 to 80 $m^2/g$ after calcination at 1,200° C. for 4 hours.

6. The silica-stabilized alumina as defined by claim 1, having a silica content ranging from 1% to 20% by weight thereof.

7. The silica-stabilized alumina as defined by claim 6, having a silica content ranging from 1.5% to 15% by weight thereof.

8. The silica-stabilized alumina as defined by claim 7, having a silica content ranging from 2% to 11% by weight thereof.

9. The silica-stabilized alumina as defined by claim 8, having a silica content ranging from 4% to 8% by weight thereof.

10. The silica-stabilized alumina as defined by claim 1, in a finely divided state.

11. A process for the preparation of the silica-stabilized alumina as defined by claim 1, comprising rehydrating an alumina powder in the presence of a silicon compound stabilizing agent, said alumina powder having been produced by the rapid dehydration of an aluminum hydroxide or oxyhydroxide, and heat-treating the product of such rehydration to remove chemically unbonded water therefrom.

12. The process as defined by claim 11, said rehydrating comprising dissolution/reprecipitation of said alumina powder in an aqueous medium.

13. The process as defined by claim 12, said rehydrating comprising suspending said alumina powder in water, at a concentration ranging from 50 to 600 g/l.

14. The process as defined by claim 12, said silicon compound comprising a precursor of silica.

15. The process as defined by claim 12, said silicon compound comprising an organosilicon compound.

16. The process as defined by claim 12, said silicon compound comprising a silica sol.

17. The process as defined by claim 12, comprising rehydrating at a temperature ranging from 70° to 110° C.

18. The process as defined by claim 11, the medium of rehydration having a pH ranging from 8 to 12.

19. The process as defined by claim 11, comprising heat-treating the product of rehydration at a temperature ranging from 100° to 700° C.

20. The process as defined by claim 11, further comprising calcining the product of heat treatment.

21. The process as defined by claim 11, comprising rehydrating to such extent that the alumina produced has a content in boehmite or pseudoboehmite ranging from 5% to 35% by weight thereof.

22. The process as defined by claim 11, said alumina powder having been produced by the rapid dehydration of hydrargillite.

23. The process as defined by claim 11, said alumina powder having a specific surface ranging from about 50 to 450 $m^2/g$, a particle diameter ranging from 0.1 to 300 $\mu m$ and a pore volume ranging from 0.10 to 0.50 $cm^3/g$.

24. The process as defined by claim 11, said alumina powder having any alkali values at least partially removed therefrom.

25. A catalyst support comprising the silica-stabilizing alumina as defined by claim 1.

26. A catalyst adopted for the catalytic conversion of exhaust gases from an internal combustion engine, comprising a catalytically active phase deposited onto the support substrate as defined by claim 25.

27. The process as defined by claim 18, said pH being adjusted by adding a base to said medium of rehydration.

* * * * *